(12) United States Patent
Moshfegh et al.

(10) Patent No.: US 7,908,934 B2
(45) Date of Patent: Mar. 22, 2011

(54) VALVE ASSEMBLY

(75) Inventors: Khosro Moshfegh, Fremont, CA (US); Jeff S. Thompson, Los Gatos, CA (US)

(73) Assignee: Dionex Corporation, Sunnyvale, CA (US)

( * ) Notice: Subject to any disclaimer, the term of this patent is extended or adjusted under 35 U.S.C. 154(b) by 386 days.

(21) Appl. No.: 12/061,601

(22) Filed: Apr. 2, 2008

(65) Prior Publication Data

US 2009/0217734 A1    Sep. 3, 2009

Related U.S. Application Data

(60) Provisional application No. 61/032,885, filed on Feb. 29, 2008.

(51) Int. Cl.
*G01N 1/00* (2006.01)
(52) U.S. Cl. ................................... 73/863.73
(58) Field of Classification Search ............... 73/863.73, 73/863.01, 863.86; 137/151; 251/62, 63
See application file for complete search history.

(56) References Cited

U.S. PATENT DOCUMENTS

| | | | |
|---|---|---|---|
| 2,816,784 A | 12/1957 | Stucke | |
| 3,175,581 A | 3/1965 | Brandenberg et al. | ... 137/596.15 |
| 3,813,105 A | 5/1974 | McQueen | |
| 3,981,620 A | 9/1976 | Abrahams et al. | |
| 4,067,407 A | 1/1978 | Berg | |
| 4,141,562 A | 2/1979 | Wu | |
| 4,173,437 A | 11/1979 | Leka et al. | |
| 4,193,606 A | 3/1980 | Iverson | |
| 4,245,963 A | 1/1981 | Hutchins et al. | |
| 4,260,342 A | 4/1981 | Leka et al. | |
| 4,282,897 A | 8/1981 | de Mey, II | ................. 137/515.7 |
| 4,453,723 A | 6/1984 | Greenwald | |
| 4,453,898 A | 6/1984 | Leka et al. | |
| 4,572,056 A | 2/1986 | Funke | |
| 4,768,933 A | 9/1988 | Stachowiak | |
| 4,825,907 A | 5/1989 | Johnson et al. | ........... 137/625.25 |
| 4,883,409 A | 11/1989 | Strohmeier et al. | |
| 4,893,823 A | 1/1990 | Strouse et al. | |
| 5,133,382 A | 7/1992 | Nielsen | ........................ 137/549 |
| 5,144,882 A | 9/1992 | Weissgerber | |
| 5,265,890 A | 11/1993 | Balsells | |
| 5,268,103 A | 12/1993 | Jameson et al. | |
| 5,431,415 A | 7/1995 | Millonig et al. | |
| 5,482,297 A | 1/1996 | Burns et al. | |
| 5,524,905 A | 6/1996 | Thoman et al. | |
| 5,542,682 A | 8/1996 | Goldstein et al. | |
| 5,660,727 A | 8/1997 | Gleave et al. | |
| 5,738,498 A | 4/1998 | Allington et al. | |
| 5,750,029 A | 5/1998 | Houck et al. | |
| 5,755,559 A | 5/1998 | Allington et al. | |
| 5,785,856 A | 7/1998 | Gleave et al. | |
| 5,799,953 A | 9/1998 | Henderson | |
| 5,843,311 A | 12/1998 | Richter et al. | |

(Continued)

*Primary Examiner* — Hezron Williams
*Assistant Examiner* — Tamiko D Bellamy
(74) *Attorney, Agent, or Firm* — Morgan, Lewis & Bockius LLP; Victor E. Johnson

(57) ABSTRACT

A valve assembly includes a valve body having an inlet port and an outlet port, the valve body also having a valve chamber extending between the inlet port and the outlet port, a pair of seals each being located on opposing ends of the valve chamber; and a reciprocating piston extending into the valve chamber and movable between a closed position extending through the pair of seals and an open position extending only through one of the pair of seals, wherein the inlet port is fluidly connected with the outlet port when the piston is in the open position. A method of using the valve assembly is also disclosed.

29 Claims, 8 Drawing Sheets

U.S. PATENT DOCUMENTS

| | | |
|---|---|---|
| 5,954,954 A | 9/1999 | Houck et al. |
| 5,979,904 A | 11/1999 | Balsells |
| 5,984,316 A | 11/1999 | Balsells |
| 5,992,856 A | 11/1999 | Balsells et al. |
| 6,007,070 A | 12/1999 | Heathcott et al. |
| 6,050,572 A | 4/2000 | Balsells et al. |
| 6,086,070 A | 7/2000 | Tremoulet, Jr. et al. |
| 6,145,845 A | 11/2000 | Tremoulet, Jr. et al. |
| 6,161,838 A | 12/2000 | Balsells |
| 6,264,205 B1 | 7/2001 | Balsells |
| 6,319,410 B1 | 11/2001 | Allington et al. |
| 6,623,630 B1 | 9/2003 | Staffler |
| 6,918,595 B2 | 7/2005 | Proper |
| 7,302,961 B2 | 12/2007 | Martin et al. .................. 137/14 |
| 2006/0120899 A1 | 6/2006 | Sengun et al. |
| 2007/0272038 A1* | 11/2007 | Schadt ....................... 73/864.01 |
| 2008/0019854 A1* | 1/2008 | Haertl .......................... 417/545 |

* cited by examiner

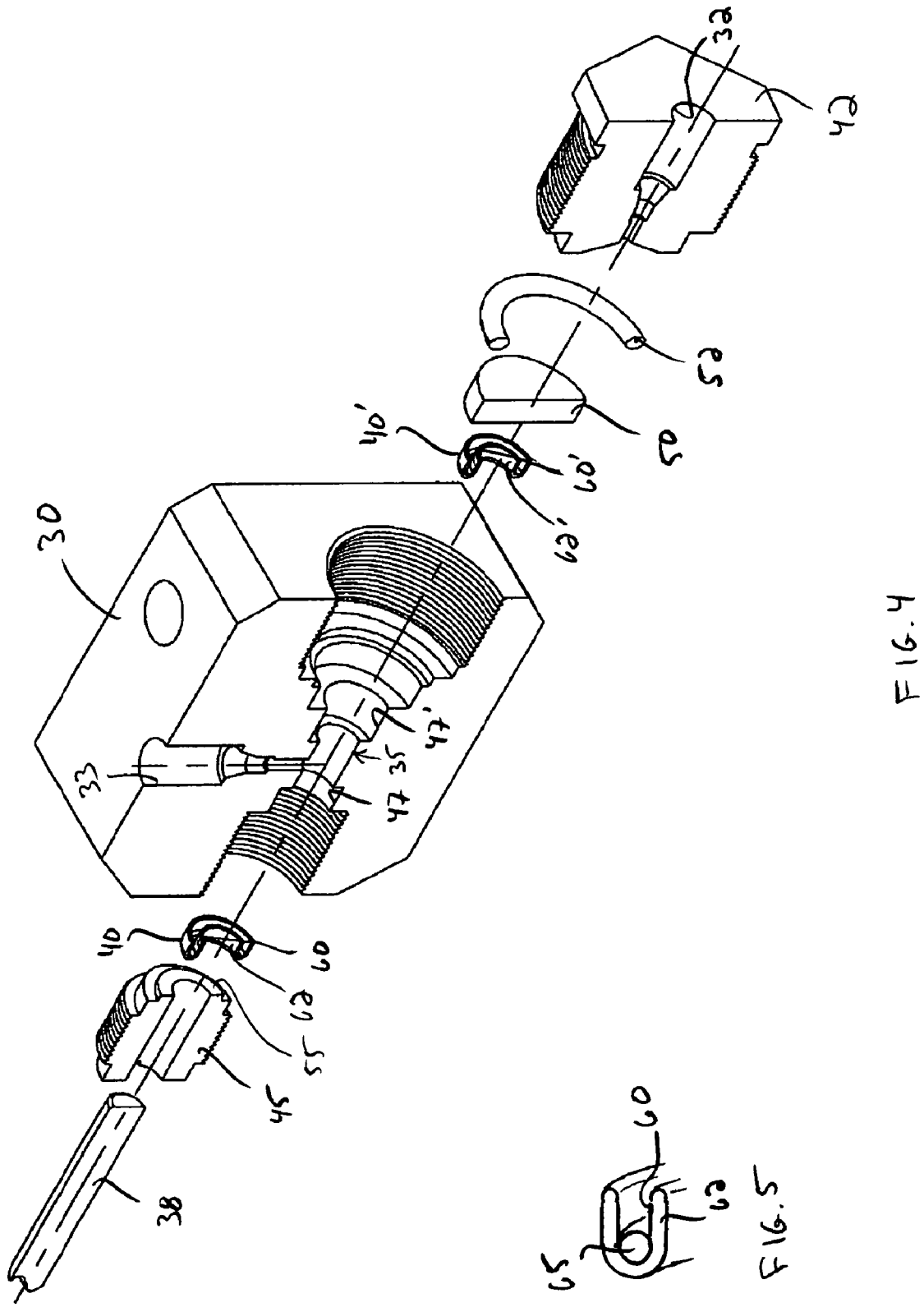

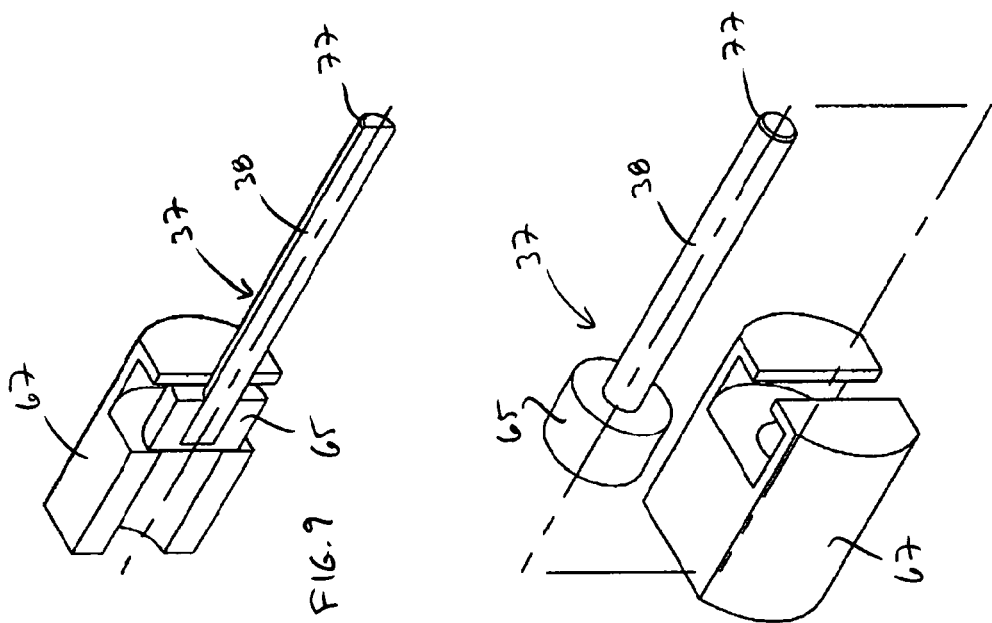

VALVE ASSEMBLY

CROSS-REFERENCES TO RELATED APPLICATIONS

This application claims priority to U.S. Provisional Patent Application No. 61/032,885 filed Feb. 29, 2008, entitled VALVE ASSEMBLY, the entire contents of which is incorporated herein by this reference.

BACKGROUND OF THE INVENTION

1. Field of the Invention

This invention relates, in general, to valve assemblies, and more particularly to fast actuation, high pressure valve assemblies for use in fluid analysis systems, and methods for their use.

2. Description of Related Art

Accelerated solvent extraction is a technique for extracting solid and semisolid samples with liquid solvents. Accelerated solvent extraction uses increased temperature and pressure with common solvents to increase the efficiency of the extraction process. The accelerated solvent extraction can be used to replace more conventional Soxhlet, sonication, boiling, wrist-shaker, and other extraction methods. Several ASE systems are currently offered by the Dionex Corporation including the ASE 100, 200, and 300 Accelerated Solvent Extraction Systems.

With accelerated solvent extraction, the sample is generally first ground and/or mixed with a dispersing agent. A weighed portion is placed in a stainless steel extraction cell, which is then heated to a predetermined temperature. Initially, a conventional static valve is opened and solvent is pumped into the extraction cell and through the static valve to a collection vial. Once a desired quantity of solvent reaches the collection vial, the static valve is closed and a high pressure pump continues to fill the extraction cell with solvent until a target pressure is achieved within the extraction cell. Target pressures often are in excess of 1500 psi and in some instances target pressures of 5000 psi, or greater, are desired.

Current systems generally utilize off-the-shelf needle and seat valves that are not particularly suited for such high pressures. Also, such valves are often made from stainless steels, including 316 SST. Unfortunately, such stainless steels are not particularly compatible with some solvents and/or with some mild acids and bases. For example, 316 SST is generally not suitable for use with 1M HCl at 200° C. Nonetheless, it is increasingly desirable to utilize such solvents, acids and bases in concentrations up to 1 M and at temperatures up to 200° C. Also, such valves lack filters and often fail prematurely. When such valves fail, the entire valve generally requires replacement, often at considerable expense with significant down time.

In light of the foregoing, it would be beneficial to have a high-pressure valve assembly for fluid analysis systems which overcome the above and other disadvantages of known valve assemblies.

BRIEF SUMMARY OF THE INVENTION

One aspect of the present invention is directed to a valve assembly including a valve body having an inlet port and an outlet port, the valve body also having a valve chamber extending between the inlet port and the outlet port, a pair of seals each being located on opposing ends of the valve chamber; and a reciprocating piston extending into the valve chamber and movable between a closed position extending through the pair of seals and an open position extending only through one of the pair of seals, wherein the inlet port is fluidly connected with the outlet port when the piston is in the open position.

The valve body may be formed of zirconium. The inlet port may be axially aligned with the piston. The valve chamber may have an inside diameter substantially equal to an outside diameter of the piston. The valve chamber may have an inside diameter larger than an outside diameter of the piston.

The valve assembly may include at least a pair of seals. At least one seal may be a toroidal seal. At least one toroidal seal may include a charging element. The charging element may be a polymer O-ring. At least one toroidal seal has open U-shaped radial cross-section. The open U-shaped radial cross-section of at least one toroidal seal may extend toward the inlet port. The open U-shaped radial cross-section of both toroidal seals may extend toward the inlet port.

The piston may include a sapphire piston body. The piston body may include a radiused end to prohibit seal wear. The piston may be driven by a double acting pneumatic cylinder. The double acting pneumatic cylinder may be driven by a 4-way pilot valve. The valve assembly may further include an axial coupler interconnecting the piston and the double acting pneumatic cylinder. The axial coupler may be dimensioned and configured to isolate side loads from the piston.

The valve assembly may further include a removable filter located between the inlet port and the valve chamber. The valve body may further include an inlet port fitting threadably engaged with a remainder of the valve body. The removable filter may be removably secured in the valve body by the inlet port fitting. The removable filter may be formed of zirconium. The removable filter may be removable to access another of the pair of toroidal seals.

The valve body may further include a piston bushing threadably engaged with a remainder of the valve body, the piston extending through the piston bushing. The piston bushing may include a seal shoulder releasably retaining one of the pair of toroidal seals in a valve seat of the valve body. The valve body may be dimensioned and configured for operating pressures of approximately 5000 psi at fluid temperatures of up to approximately 200° C.

Another aspect of the present invention is directed to a fluid analysis system including the valve assembly described above. A fluid reservoir may be in fluid communication with the inlet of the valve assembly.

Still another aspect of the present invention is directed to an accelerated solvent extraction system including the valve assembly described above. An extraction cell may be in fluid communication with the outlet of the valve assembly.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is an exploded perspective cross-sectional view of the high-pressure valve of FIG. 1.

FIG. 5 is an enlarged fragmented perspective view of a piston seal of the high-pressure valve assembly of FIG. 1.

FIG. 9 is a perspective cross-sectional view of the piston assembly and axial coupler of FIG. 1.

FIG. 10 is a perspective view of the piston assembly and axial coupler of FIG. 1 with the piston assembly disengaged from the axial coupler.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
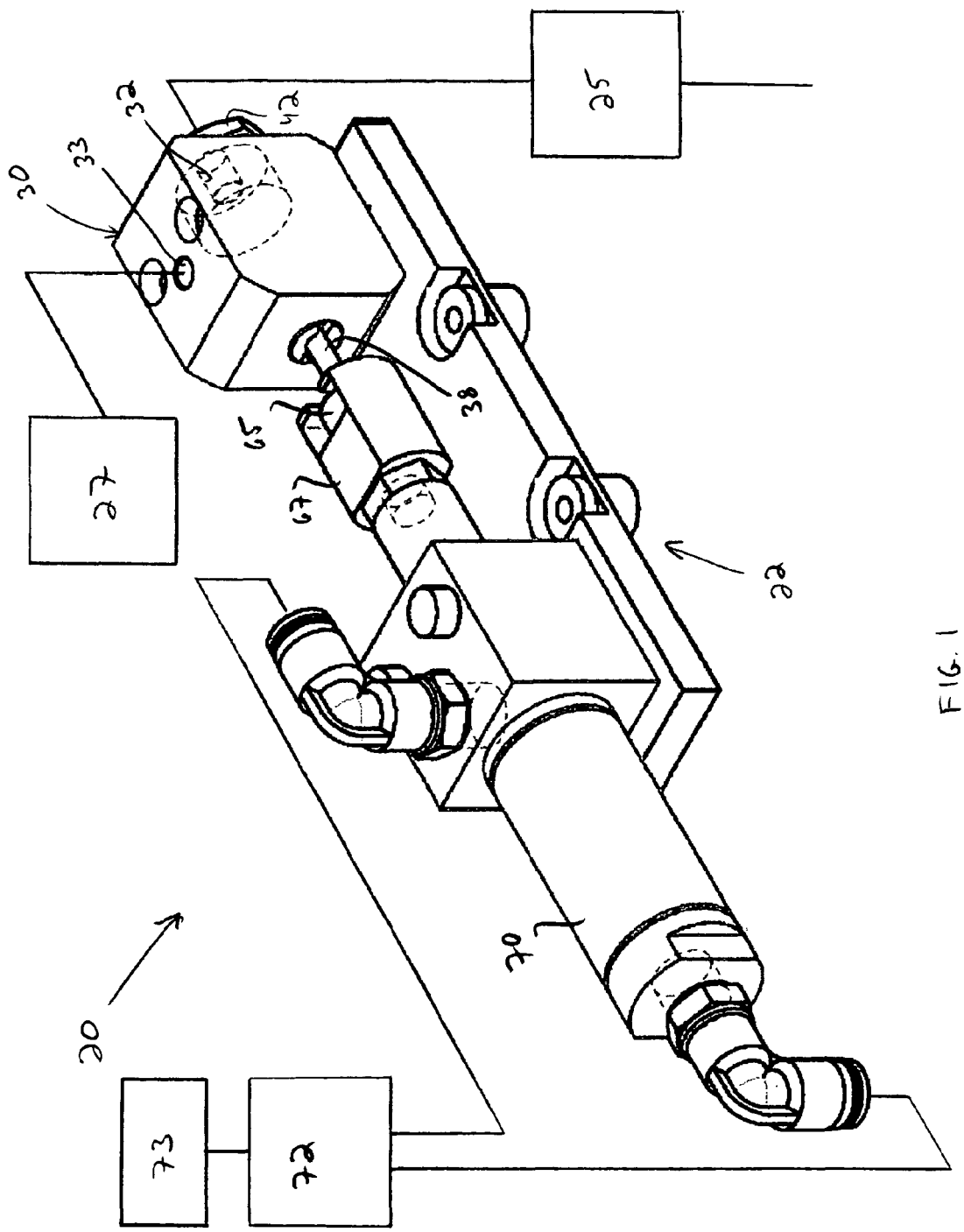
FIG. 1 is partially schematic and partially perspective view of an exemplary valve assembly in combination with a fluid analysis system in accordance with various aspects of the present invention.

Turning now to the drawings, wherein like components are designated by like reference numerals throughout the various figures, attention is directed to FIG. 1 which illustrates an exemplary fluid analysis system, an accelerated solvent extraction system generally designated by the numeral 20, incorporating an exemplary high pressure, fast actuation valve assembly 22 in accordance with the present invention. The illustrated valve assembly is particularly well suited for use in controlling fluid flow within an accelerated solvent extraction system, however, one will appreciate that valve assemblies in accordance with the present invention will also be well suited for use controlling fluid flow, both gas and liquid, in other fluid systems including, but not limited to, high pressure liquid chromatography systems, ion chromatography systems, and various other fluid analysis systems used in the environmental, life sciences and industrial fields.

Generally, accelerated solvent extraction system 20 includes an extraction cell 25, which is configured to receive and heat a sample mixed with a dispersing agent in an otherwise conventional manner. Extraction system also includes a collection vial 27, which is configured to receive the extracted sample in an otherwise conventional manner. Valve assembly 22 is configured to meter a desired amount of the extracted sample from the extraction cell to the collection vial. The valve assembly includes a valve body 30 having an inlet port 32 in fluid communication with the extraction cell, and an outlet port 33 in fluid communication with the collection vial. In the case of accelerated solvent extraction, the extracted sample is generally a particulate sample supported and/or partially or wholly dissolved in a liquid. As will be apparent below, the valve assembly of the present invention is particularly suited for handling fluid flow which may include particulate matter therein, which matter often damages and/or causes premature failure of conventional valves.

Figure 2:
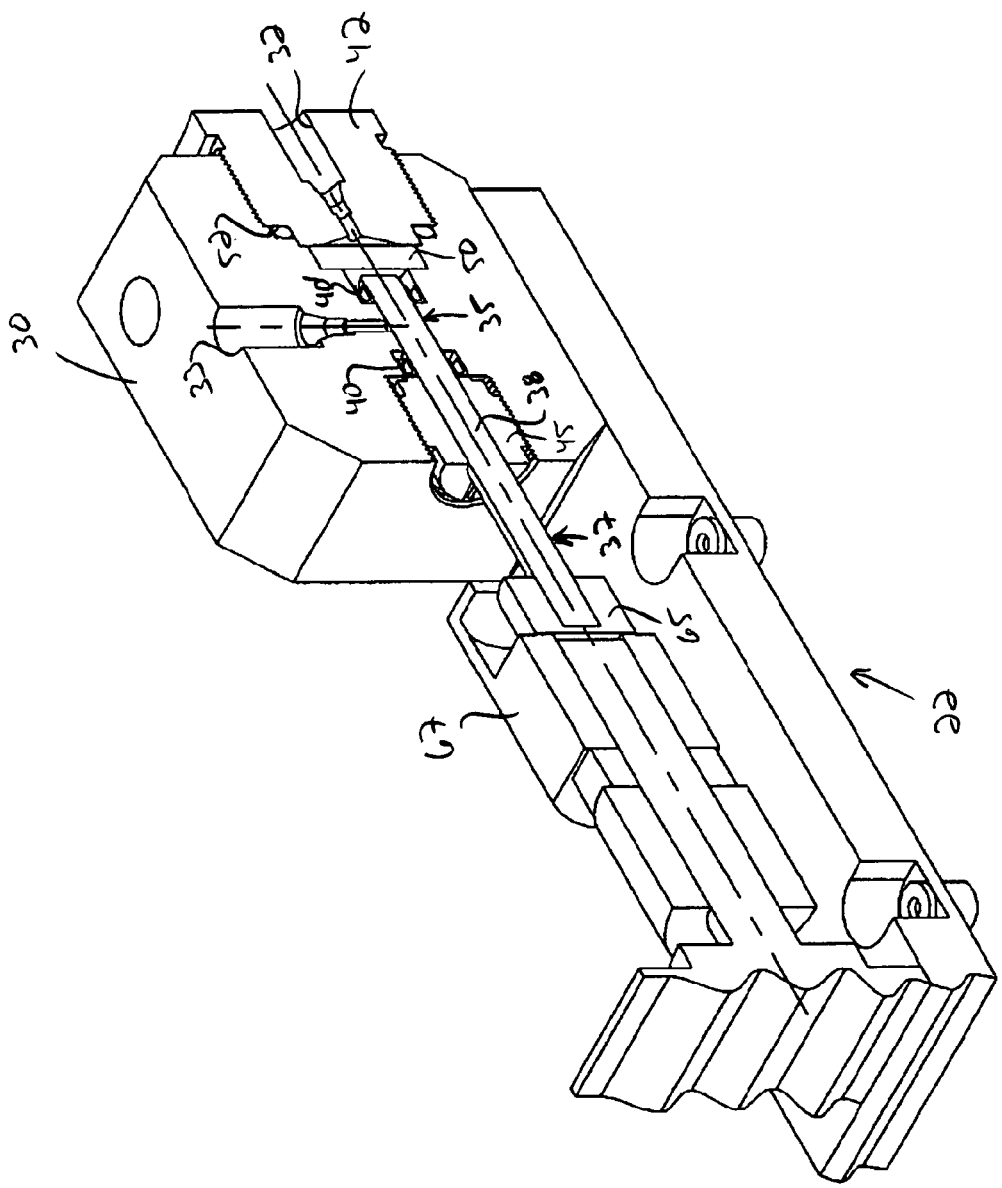
FIG. 2 is a perspective cross-sectional view of the high-pressure valve assembly of FIG. 1.
Figure 3:
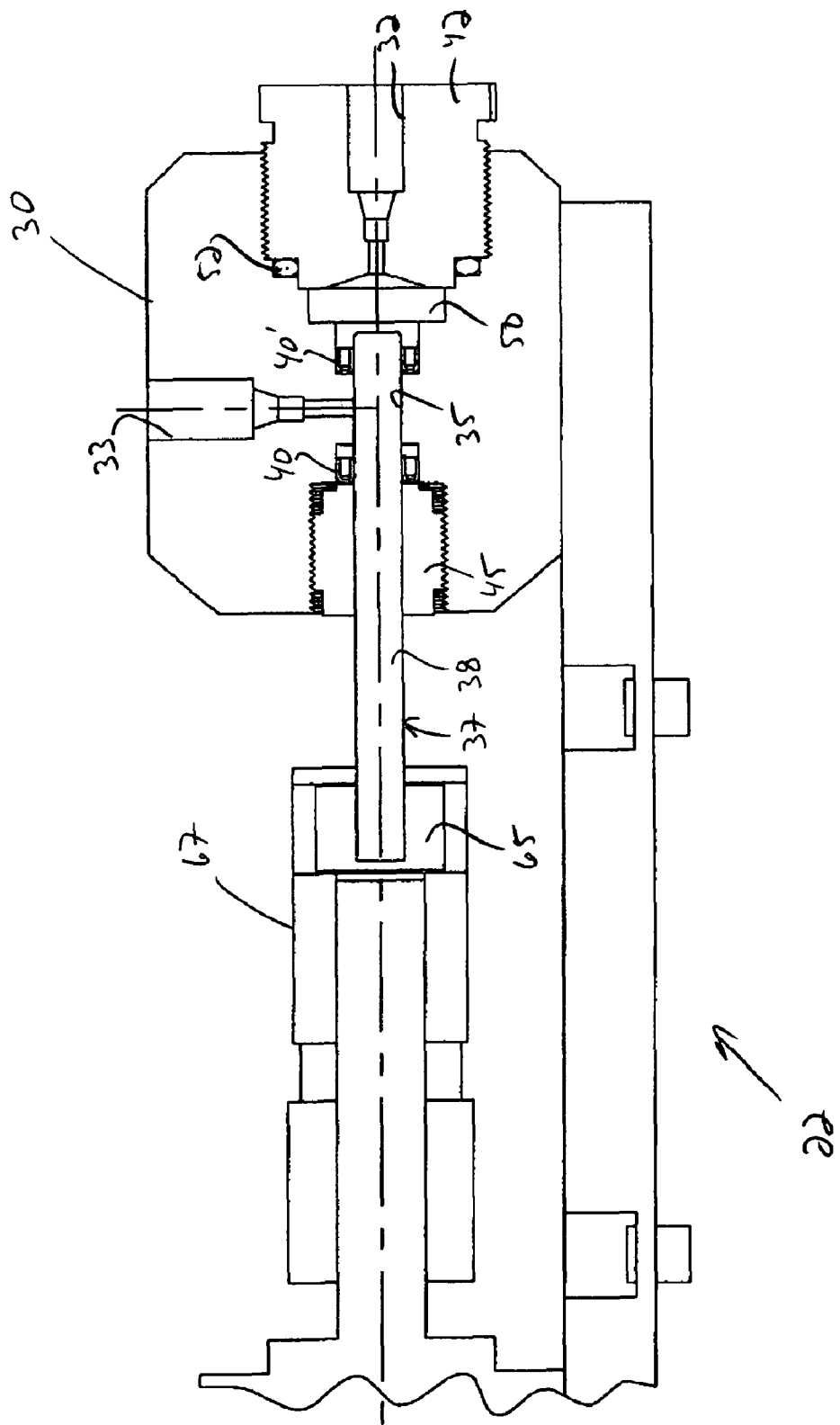
FIG. 3 is an elevational cross-sectional view of the high-pressure valve assembly of FIG. 1.

With reference to FIG. 2, the valve body includes a valve chamber 35 in fluid communication with both the inlet and outlet ports, which valve chamber receives a reciprocating piston assembly 37 having a piston body 38 that selectively opens and closes the valve assembly in order to meter extracted sample from the extraction cell to the collection vial. In accordance with the present invention, the valve assembly includes two piston seals 40, 40' axially aligned with the piston assembly and located on either side of the valve chamber. In the closed position, the piston assembly extends through both piston seals and thus fluidly closes the outlet port from the inlet port (see, e.g., FIG. 5). In the open position, the piston assembly extends only through one piston seal, thereby opening fluid communication of the outlet port with the inlet port (see, e.g., FIGS. 6 and 7). Such configuration allows for a simplified valve assembly design which not only facilitates maintenance but also allows for a relatively inexpensive valve assembly that is capable of relatively fast actuation cycles at high fluid pressures and temperatures.

In one exemplary embodiment, the piston assembly has a relatively long stroke, e.g., approximately one-quarter inch, and its stoke allows it to clear the outlet port. In this embodiment, the valve chamber 35 may have an inner wall diameter that is substantially equal to the outer diameter of the piston body 38 such that the piston body itself primarily serves to block fluid communication between the inlet and outlet ports through the valve chamber in that there is little clearance between the piston body and the valve chamber to allow fluid flow. In this embodiment, the piston body must move to the left a sufficient amount to clear the outlet port 33 and open fluid communication with the outlet port 33 (see FIG. 6). In another exemplary embodiment, the piston assembly has a shorter stroke, e.g., approximately one-eighth inch, which stroke may not allow the piston body to clear both the seal and the outlet port. Such a shorter stroke configuration is advantageous in that it allows for shorter cycle times. In this exemplary embodiment, valve chamber 35a has an inner wall diameter that is larger than the outside diameter of piston body 38 which allows fluid flow between the piston body and the valve chamber wall (see FIG. 7). Preferably, the radial clearance between the piston body and the valve chamber wall is approximately 0.003-0.010 inches, and more preferably approximately 0.005-0.006 inches to provide a suitable passageway for fluid flow. In this embodiment, the cooperation between valve body 30 and right piston seal 40' serves to block fluid communication between the inlet and outlet ports through the valve chamber.

In the exemplary embodiment, outlet port 33 is bored directly into valve body 30, while inlet port is provided on an inlet port fitting 42 that is threadably removable from the valve body. One will appreciate, however, that other port configurations may be used. For example, the outlet port may also be provided with a threaded outlet port fitting, and/or the inlet port may be provided on a non-threaded member.

The valve body also includes a piston bushing 45 that is also threadably removable from the valve body. One will appreciate, however, that other configurations may be utilized. For example, the valve body may include a simple bore through which the piston assembly is received, and/or the piston bushing may be a non-threaded member.

The threaded configuration of the inlet port fitting and piston bushing is particularly advantageous as it allows easy access to the valve chamber as well as various components of the valve assembly located within valve body 30. With reference to FIG. 4, removal of piston bushing 45 allows for easy installation and/or removal of piston seal 40 from a valve seat 47 of the valve body, while removal of inlet port fitting 42 allows for easy installation or removal of piston seal 40' from another valve seat 47' of the valve body. In the exemplary embodiment, removal of the inlet port fitting also allows for easy installation or removal of other components including a filter 50 and O-ring inlet port seal 52.

With continued reference to FIG. 4, both the inlet port fitting 42 and the piston bushing 45 are axially aligned with the piston assembly 37. The axially and axial configuration of the valve body, inlet port fitting, and piston bushing, is particularly advantageous in that it allows the valve chamber 35, the piston seal seats 47, 47', and other features of the valve body to be simply bored into the valve body. Such configuration also allows piston seal 40 to simply be directly held in place by an inner bushing end 55 of piston bushing 45, and allows piston seal 40' to be indirectly held in place by filter 50, which in turn is held in place by inner fitting end 57 of inlet port fitting 42. Such configuration simplifies design and facilitates a significant reduction in the part count of the valve assembly.

The valve body and other wetted structural components of valve assembly components are preferably constructed of materials having a broad compatibility with a wide range of solvents and mild acids and bases, and is capable of operation at high pressures and high temperatures. Preferably, the valve body is formed of zirconium, which has been tested to have a broad compatibility with the wide range of solvents and mild acids and bases typically used in accelerated solvent extraction and other fluid analysis systems. Zirconium is generally superior to the 316 SST often used in prior systems. Zirconium is compatible for use with solvents, acids and bases in concentrations up to 1 M and at temperatures up to 200° C. In particular, zirconium has been found to be compatible for hydrochloric acid (HCl) in concentrations of 1M at temperatures up to 200° C. One will appreciate that other suitable materials may be used for the valve body and other wetted components. For example, titanium, Hastelloy® metals, tantalum, molybdenum, silicon nitride, silicon carbide, and other metals or ceramics with good resistance to solvents, acids, and bases at high temperatures, PEEK, PPS, Kel-F®, and/or other inert engineering polymers may be used, however, such materials will have with less solvent compatibility than zirconium.

The piston body is preferably formed of sapphire, which also has a broad compatibility with the wide range of solvents and mild acids and bases typically used in accelerated solvent extraction and other fluid analysis systems. Sapphire is also particularly suited to minimize seal wear and has an excellent cost-to-performance ratio. One will appreciate, however, that other suitable materials may be used for the piston body. For example, zirconia ceramic, hipped zirconia ceramic, zirconium, and/or the other metals and polymers listed above.

Turning now to the piston seals, in the illustrated embodiment, piston seals 40, 40' are toroidal and have an open U-shaped radial cross-section (see, e.g., FIGS. 4 and 5). One will appreciate that other piston seal configurations may be utilized. For example, piston seal may be a simple O-ring provided that it is dimensioned and configured to withstand high fluid pressures and temperatures.

Preferably, the piston seal is formed of a polymeric material. Suitable materials for the seal body include, but are not limited to graphite impregnated polytetrafluoroethylene (PTFE) or TEFLON®, ultra-high molecular weight polyethylene, unfilled polypropylene, TFE filled polypropylene, polyimid, and PEEK. Additionally, the seal jacket may be formed of one or more of these materials blended with other performance enhancing additives such as TEFLON®.

The open U-shaped radial cross-section of the piston seals is particularly advantageous when the U-shaped opening is directed toward the inlet port. As the open U-shaped radial cross-section of piston seals 40, 40' is directed and open toward inlet port 32, inner seal surfaces 60, 60' are directly exposed to fluid entering the valve chamber through the inlet port. As such, the inner seal surfaces are also directly exposed to the pressure of the entering fluid. In high-pressure applications such as accelerated solvent extraction, the high pressure exerted against inner seal surfaces 60, 60' promote increased sealing engagement between the piston seals and the piston body as such pressure provides a compressive force that biases inner wall 62, 62' against the piston body 38 (see, e.g., arrow B in FIG. 6). In the illustrated embodiment, both piston seals 40, 40' are directed toward the inlet port, however, one will appreciate that either one or both may be directed as such to promote sealing.

In an exemplary embodiment, seals 40, 40' may further include an energizing seal component 65 (see FIG. 5). The energizing seal component may be utilized to provide a supplemental compressive force for increased sealing engagement of the piston seal against the piston body. The energizing seal component has an aperture through which inner seal wall 62 extends and, in one embodiment, is in the form of an O-ring. Preferably, the energizing seal component is formed of a polymer O-ring or metallic spring. Suitable materials for the O-ring include, but are not limited to fluorosilicone (FVMQ), polyacrylate (ACM, ANM), polysulfide (T), silicone (Q), fluorocarbon (FKM), perfluorocarbon (FFKM), fluorophosphonitrilic (FZ), perfluorastomer (FFKM), chlorosulfonated polyethylene (CSM), ethylene/propylene/diene or ethylene propylene terpolymer (EPDM), ethylene/propylene or ethylene propylene copolymer (EPM), isobutylene/isoprene or butyl (IIR), polychloroprene (CR), urethane, polyether urethane (EU), epichlorohydrin (CO, ECO), polypropylene oxide (GPO), butadiene/acrylonitrile or Buna N (NBR), butadiene/styrene or Buna S (SBR), cis polybutadiene (BR), cis 1, 4, polyisoprene (NR, IR), polyester urethane (AU), ethylene-propylene (EPR), synthetic rubber and rubber compositions such as VITON® produced by DuPont Dow Elastomers L.L.C. of Wilmington Del., and nitrite (buna-N).

As noted above, valve assembly 22 also incorporates a removable filter or frit 50 which is provided to keep small particles in the fluid flow from entering valve chamber 35 and prohibits such small particles from damaging the seals. One will appreciate that such a filtered configuration may significantly reduce maintenance and increase the lifespan of the valve assembly. In the illustrated embodiment, the filter is a frit having 90 μm openings, which opening are sufficiently large to allow sample to pass unobstructed while filtering out sand, which may be present in the extraction cell, and/or other undesired materials. One will appreciate that other configurations and/or open sizes may be utilized depending upon the sample and desired filtering.

Figure 6:
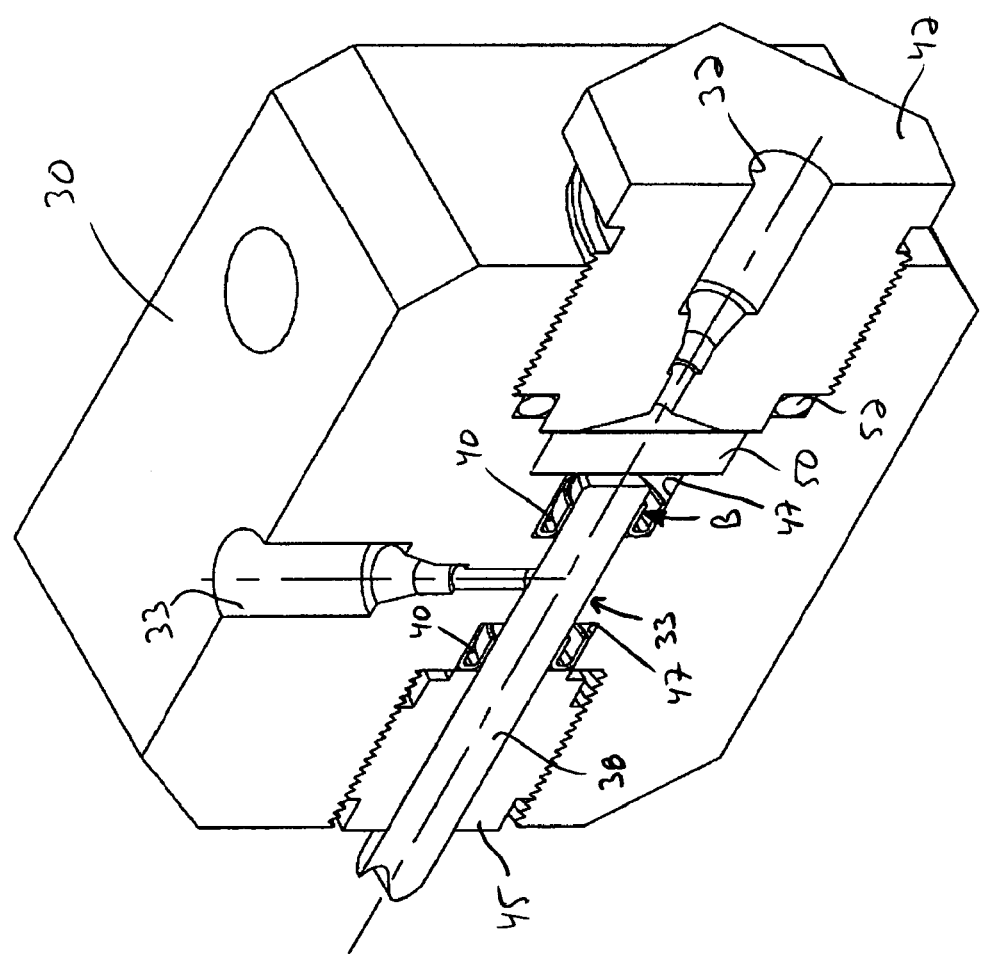
FIG. 6 is a perspective cross-sectional view of the high-pressure valve of FIG. 1 with the piston in a closed position.
Figure 7:
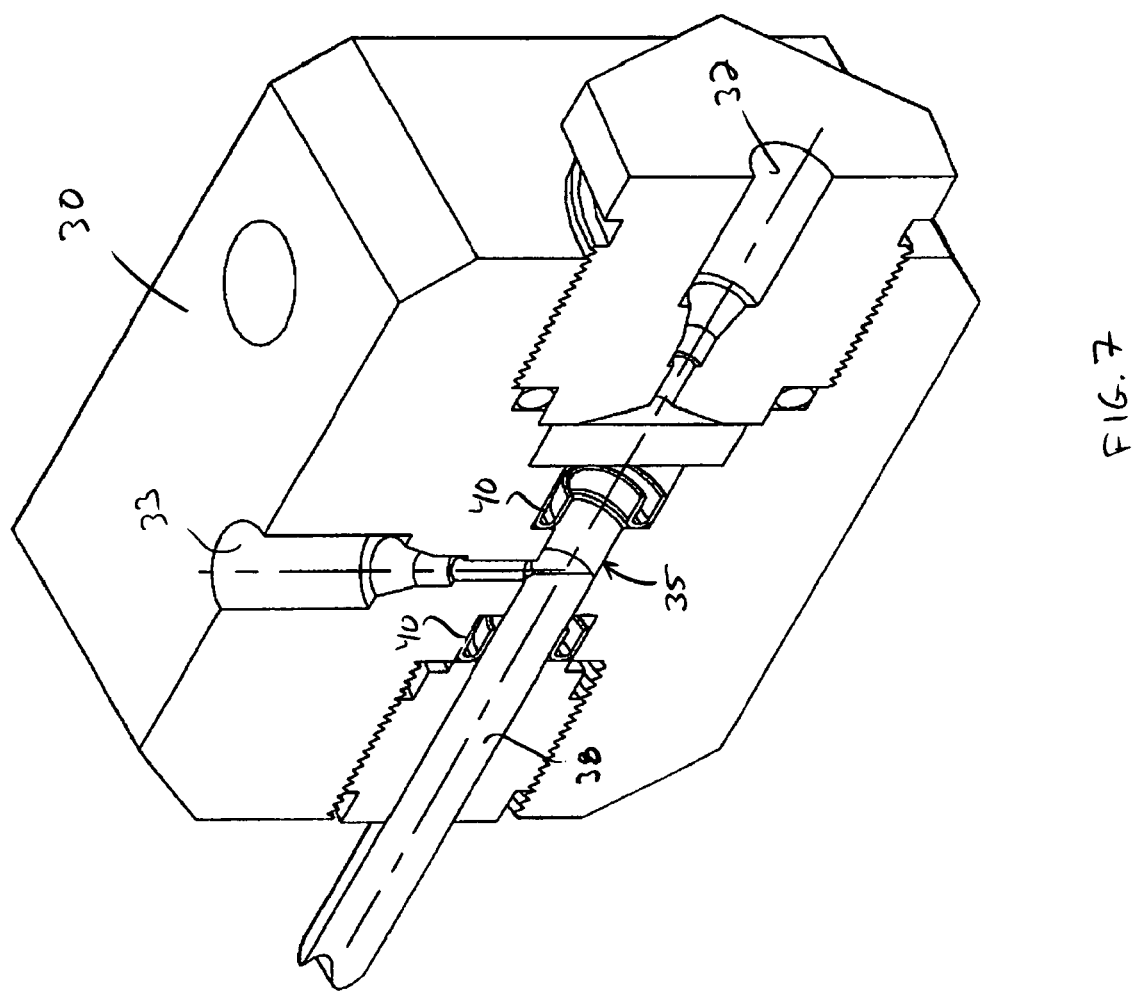
FIG. 7 is a perspective cross-sectional view of the high-pressure valve of FIG. 1 with the piston in an open position.

In operation and use, two piston seals 40, 40' are placed in their respective seal seats 47, 47' adjacent valve chamber 35 of valve body 30 (see, FIGS. 4 and 6). The seals are placed such that the open U-shaped radial cross-section is facing the pressurized fluid entering through inlet port 32 in order to facilitate additional sealing force as pressure increases. Piston bushing 45 is threaded into the valve body from the left side to keep piston seal 40 in place. Seal 40', filter 50, and O-ring inlet port seal 52 are held in place as inlet port fitting 42 is threaded in to the valve body 30 from the right side. Sapphire piston body 38 is inserted through a bore of piston bushing 45 and then through piston seals 40, 40'.

With reference to FIG. 1, a ferrule end 65 of the piston assembly is captured in an axial coupler linkage 67 and operably connected to a double acting pneumatic cylinder 70 which drives piston assembly in a reciprocating manner left-and-right. The pneumatic cylinder, in turn, is preferably operated by a 4-way pilot valve 72 that, in turn, is controlled by an appropriate controller 73. Preferably, the pneumatic cylinder and pilot valve are configured for operation with relatively low pneumatic pressure, preferably on the order of 50 psi pneumatic pressure. Preferably the electronic pulses sent by the controller to the pilot valve are on the order of 15 ms or less. One will appreciate that other suitable drive means and control means may be utilized to quickly cycle the piston assembly to left and right.

The axial coupler linkage is dimensioned and configured to isolate the piston assembly from side loads. In particular, coupler linkage 67 does not engage the sides of ferrule end 65 of piston assembly 37 (see FIG. 9) and instead engages front and rear surfaces ferrule end. Such configuration also allows for easy disassembly as the piston assembly may simply be slid out of engagement of the coupler linkage and vise versa (see FIG. 10).

Figure 8:
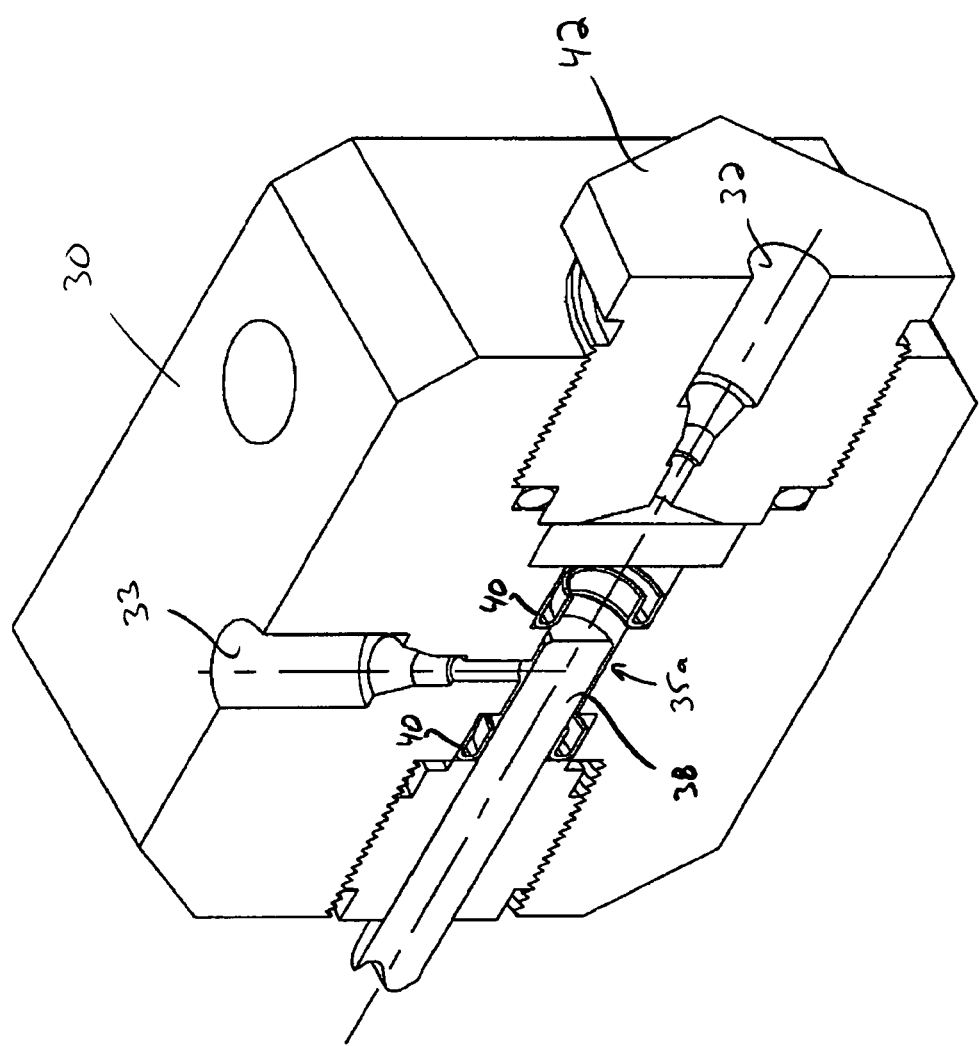
FIG. 8 is a perspective cross-sectional view of another high-pressure valve in accordance with the present invention, similar to that shown in FIG. 5 and with the piston in an open position.

When the valve assembly is in the closed position, that is, when piston body 38 is actuated to the right (see FIG. 6), the valve assembly allows no fluid flow through valve chamber 35. When the valve assembly is in the open position, that is, when the piston body is actuated to the left (see FIGS. 7 and 8), the valve assembly allows fluid flow through valve chamber 35 from inlet port 32 to outlet port 33. In the open position, the end of piston body 38 is located intermediate the two piston seals 40, 40'. As can be seen in the figures, piston body 38 always extends through and is thus sealingly engaged with the leftmost piston seal 40, but only sealingly engages the rightmost piston seal 40' when the valve assembly is closed (see FIG. 6). Preferably, piston body is provided with a filleted or radiused end 77 to lessen wear-and-tear and promote the life of piston seal 40'.

Filter 50 is placed adjacent the inlet port fitting 42 and is thus in the fluid stream before the fluid reaches piston seals 40, 40'. As such, the filter prevents particulate matter that may be found in the fluid from reaching the piston seals. As such, the filter may significantly increase reliability by preventing such particulate matter from prematurely causing seal failure.

Advantageously, the configuration of the valve assembly of the present invention allows for fast actuation, which may be important to relieve the pressure within extraction cell, but not let so much solvent through that the temperature of the extraction cell is reduced while pressure is restored in the extraction cell.

Advantageously, the valve assembly of the present invention may be rebuilt to function as a new valve for a relatively low cost. The wetted materials of the valve assembly are preferably zirconium, sapphire, and graphite impregnated TEFLON®. These materials allow the valve assembly to be used with a wide range of solvents along with mild acids and bases up to 1 M concentration up to 200° C. Also, the piston seals and filter of the present invention are relatively low cost consumable parts. When the piston seals and filter are replaced, they return the valve to nearly new functionality. In contrast, prior conventional valves generally need to be entirely replaced when they fail, at considerable expense to the end user.

The features of the present invention discussed above provide for a valve assembly that is easier to maintain and has a increased lifespan. Testing has demonstrated that an exemplary valve assembly described herein are capable of over 320,000 to over 620,000 cycles (or 12-23 months of heavy use) before failure when the fluid is at 200° C. Testing has also demonstrated that an exemplary valve assembly described herein is capable of passing a 25,000 cycle test when the sample includes kaolin clay at 200° C.

For convenience in explanation and accurate definition in the appended claims, terms such as "left" and "right", "inner", and other relative terms are used to describe features of the exemplary embodiments with reference to the positions of such features as displayed in the figures.

In many respects various modified features of the various figures resemble those of preceding features and the same reference numerals followed by subscripts "a" designate corresponding parts.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A valve assembly comprising:
   a valve body including an inlet port and an outlet port, the valve body also including a valve chamber fluidly coupling the inlet port and the outlet port;
   a pair of seals each being located on opposing sides of the valve chamber on either side of the outlet port; and
   a reciprocating piston extending into the valve chamber and movable between a closed position extending through the pair of seals and an open position extending only through one of the pair of seals;
   wherein the inlet port is fluidly connected with the outlet port when the piston is in the open position.

2. The valve assembly of claim 1,
   wherein the valve body is formed of zirconium.

3. The valve assembly of claim 1,
   wherein the inlet port is axially aligned with the piston.

4. The valve assembly of claim 1,
   wherein the valve chamber has an inside diameter substantially equal to an outside diameter of the piston.

5. The valve assembly of claim 1,
   wherein the valve chamber has an inside diameter larger than an outside diameter of the piston.

6. The valve assembly of claim 1, comprising:
   at least a pair of seals.

7. The valve assembly of claim 6,
   wherein at least one seal is a toroidal seal.

8. The valve assembly of claim 7,
   wherein at least one toroidal seal includes a charging element.

9. The valve assembly of claim 8,
   wherein the charging element is a polymer O-ring.

10. The valve assembly of claim 7,
    wherein at least one toroidal seal has an open U-shaped radial cross-section.

11. The valve assembly of claim 10,
    wherein the open U-shaped radial cross-section of at least one toroidal seal extends toward the inlet port.

12. The valve assembly of claim 10,
    wherein the open U-shaped radial cross-section of both toroidal seals extends toward the inlet port.

13. The valve assembly of claim 1,
wherein the piston includes a sapphire piston body.

14. The valve assembly of claim 13,
wherein the piston body includes a radiused end to prohibit seal wear.

15. The valve assembly of claim 1,
wherein the piston is driven by a double acting pneumatic cylinder.

16. The valve assembly of claim 15,
wherein the double acting pneumatic cylinder is driven by a 4-way pilot valve.

17. The valve assembly of claim 16, the valve assembly further comprising:
an axial coupler interconnecting the piston and the double acting pneumatic cylinder, the axial coupler dimensioned and configured to isolate side loads from the piston.

18. The valve assembly of claim 1,
the valve assembly further comprising a removable filter located between the inlet port and the valve chamber.

19. The valve assembly of claim 18,
the valve body further comprising an inlet port fitting threadably engaged with a remainder of the valve body.

20. The valve assembly of claim 19,
wherein the removable filter is removably secured in the valve body by the inlet port fitting.

21. The valve assembly of claim 20,
wherein the removable filter is formed of zirconium.

22. The valve assembly of claim 20,
wherein the removable filter is removable to access another of the pair of seals.

23. The valve assembly of claim 1,
the valve body further comprising a piston bushing threadably engaged with a remainder of the valve body, the piston extending through the piston bushing.

24. The valve assembly of claim 23,
wherein the piston bushing includes a seal shoulder releasably retaining a respective one of the pair of seals in a valve seat of the valve body.

25. The valve assembly of claim 1,
wherein the valve chamber is dimensioned and configured for operating pressures of approximately 5000 psi at fluid temperatures of up to approximately 200° C.

26. A fluid analysis system comprising:
the valve assembly of claim 1; and
a fluid reservoir in fluid communication with the inlet of the valve assembly.

27. A method of fluid analysis comprising:
providing a sample into a fluid reservoir of a fluid analysis system, wherein the fluid reservoir is fluidly coupled to the valve assembly of claim 1; and
actuating the valve assembly to meter the sample from the fluid reservoir to a sample collection vial of the fluid analysis system.

28. An accelerated solvent extraction system comprising:
the valve assembly of claim 1; and
an extraction cell in fluid communication with the inlet of the valve assembly.

29. A method of fluid analysis comprising:
providing a sample into an extraction cell of an accelerated solvent extraction system, wherein the extraction cell is fluidly coupled to the valve assembly of claim 1; and
actuating the valve assembly to meter the sample from the fluid reservoir to a sample collection vial of the accelerated solvent extraction system.

* * * * *